UNITED STATES PATENT OFFICE.

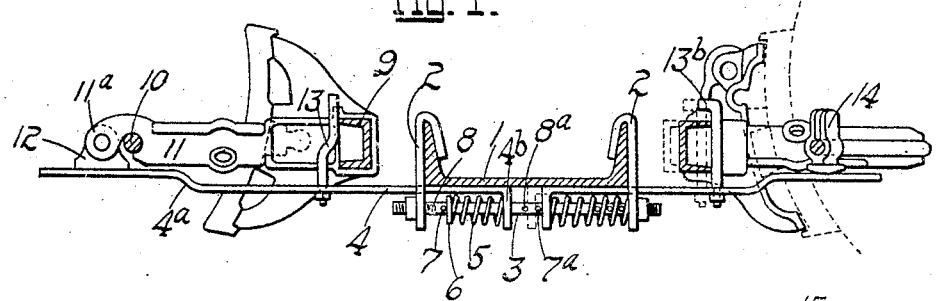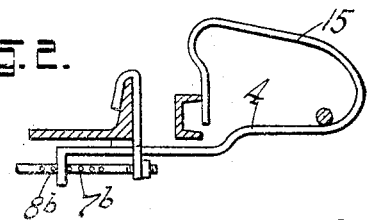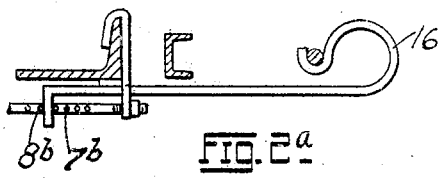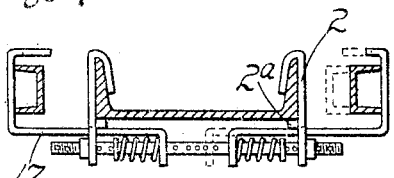

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

ADJUSTABLE SUPPORT FOR BRAKE-BEAMS.

1,381,379. Specification of Letters Patent. Patented June 14, 1921.

Application filed February 9, 1920. Serial No. 357,228.

*To all whom it may concern:*

Be it known that I, CHARLES HAINES WILLIAMS, a citizen of the United States, residing at the city of Chicago, county of Cook, and State of Illinois, have invented a certain new and useful Improvement in Adjustable Supports for Brake-Beams, of which the following is a full, clear, and exact description, such as will enable others skilled in the art to which it appertains to make and use the same, reference being had to the accompanying drawings, forming part of this specification, in which—

Figure 1 is one form of my improved adjustable support.

Fig. 1ª is a modification of a detail of the form shown in Fig. 1.

Fig. 2 is a modified form of adjustable support.

Fig. 2ª is a modified form of retractile brake beam support, and

Fig. 3 is another modified form of retractile support.

This invention relates to a new and useful improvement in an adjustable support for brake beams in which an automatic brake release may form a part. Each support consists of two independent supporting arms connected in some manner to the spring plank with the projecting arms located under the brake beams and acting as a combined safety device and brake beam release and support for the sliding chair. I have shown several forms of my invention which will now be described.

In Fig. 1, 1 indicates a spring plank of a truck to which are secured supporting guides 2. These guides preferably have hooked ends to engage the flanges of the spring planks and are provided with openings in their lower ends located below the spring plank through both of which passes a tie bolt 3 for securing the guide plates 2 in position. This tie bolt has nuts at each end held against displacement by cotter pins or other means. At the left-hand side of Fig. 1 is shown a supporting member and safety device 4 for the brake beam which at its outer end is provided with a jog or bend 4ª whereby the outer end of this supporting and safety member is located in a horizontal plane higher than that of the inner portion of said support. The inner end of this support passes through an opening in the guiding plate 2 and under the spring plank 1, its extreme inner end being bent at 4ᵇ and provided with an opening through which passes the tie rod 3, whereby said bent inner end is guided against movement and also serves as a spring seat for a spring 5 whose outer end is seated against a washer 6 bearing upon a pin 7 passing through the tie rod. There may be several openings 8 for the pin 7, whereby different lengths of springs may be used. Openings 8ª may be provided through which pins 7ª may be arranged to adjustably arrest the retracting movement of the support.

Numeral 9 indicates the compression member of a brake beam, 10 the tension member thereof and 11 the strut whose outer end in this instance may be provided with a nose 11ª in which is mounted a chair 12 for riding upon the support 4 and guiding the brake beam in its brake applying movement. It is obvious that this chair could be dispensed with and the strut 11 permitted to engage directly with the raised outer end of the support 4. Numeral 13 indicates a release arm mounted in the support 4 and engaging the compression member 9. This release arm can be in the form of a U-shaped member 13ª, shown in Fig. 1ª, whose legs stand up on each side of the strut member 11 and coöperate with the compression member, as shown in Fig. 1. The construction above described is especially adapted for a third point support.

In operation the release arm carried by the support bears against the front of the compression member, and when power is applied to the beam the supporting arm is moved outwardly from the spring plank and compresses the coiled spring 5. When the power is released, the spring tends to individually release the brake beam.

At the right-hand side of Fig. 1, I have shown a construction similar to that just described but with the exception that I have illustrated fourth point supports 14 mounted on the tension member of the beam, and there being two of these supports on each beam, there is a necessity for the duplication of the mechanism located near each end of the beam. I have also shown in this construction the upper ends of the release arm bent over the beam, as indicated at 13ᵇ, to prevent the compression member of the beam from rising.

In Fig. 2, I have illustrated a modification in which a supporting track or member 4 is shown as being extended, as at 15, to provide a spring which will engage the front face of the compression member of the beam, thereby dispensing with the use of the release arms shown in Fig. 1. This return spring portion of the track member 4 could be made to engage the tension member of the beam, as shown at 16, in Fig. 2ª. In the forms shown in Figs. 2 and 2ª, the inner end of the support is adjustably mounted on the tie bar by means of pins 8ᵇ passing through openings 7ª in the tie bar.

In Fig. 3, I have shown a form of my invention in which the releasing mechanism thereof may be employed in connection with existing structures already equipped with third or fourth point supports. In this form the sliding member 17, forming a retractile beam supporting element, is bent upwardly in front of the compression member and then over the top thereof, said member constituting a safety device, and the upper end thereof preventing the beam from rising too high. The guide plates 2 in this form are also provided with inwardly extending teats 2ª which extend under the spring plank and serve to prevent the guiding plates 2 from displacement and unnecessary movement.

What I claim is:

1. The combination of a brake beam support movable longitudinally of its major axis and retracting means coöperating therewith.

2. The combination of a retractable brake beam support and means carried thereby for engaging the brake beam.

3. The combination of a spring plank, a brake beam support movable transversely thereof, and means supported by the spring plank for retracting said support.

4. The combination of a spring plank, a brake beam support movable transversely thereof, means carried by said support for engaging the brake beam, and retracting springs carried by the spring plank for engaging the brake beam support.

5. The combination of a spring plank, of guide plates supported thereby, a tie bar for said guide plates, brake beam supports mounted in said guide plates and engaging said tie bar, and springs coöperating with said brake beam supports.

6. The combination of a retractable brake beam support and means thereon for engaging and retracting the brake beam, said means being provided with an overhang whereby the brake beam is prevented from rising.

7. The combination of a brake beam support and its retracting springs, and means for adjusting the expansibility of said springs.

8. The combination with a brake beam support, of a retracting spring, and means for adjusting the compressibility of said retracting spring.

9. The combination with a spring plank, of a retractile brake beam support provided with means to engage the brake beam and form thereby a retracting spring.

10. The combination of a retractable brake beam support, and means for adjusting the same and its retracting means to accommodate different locations of beams.

In testimony whereof I hereunto affix my signature this sixth day of February, 1920.

CHARLES HAINES WILLIAMS.